(12) United States Patent
Lu et al.

(10) Patent No.: US 9,969,450 B1
(45) Date of Patent: May 15, 2018

(54) BICYCLE CELLULAR PHONE HOLDER STRUCTURE

(71) Applicant: MACE GROUP, INC., Ontario, CA (US)

(72) Inventors: Yu Sheng Lu, Ontario, CA (US); Huai Hsiang Lu, New Taipei (TW)

(73) Assignee: Mace Group, Inc., Ontario, CA (US)

( * ) Notice: Subject to any disclaimer, the term of this patent is extended or adjusted under 35 U.S.C. 154(b) by 0 days. days.

(21) Appl. No.: 15/489,928

(22) Filed: Apr. 18, 2017

(30) Foreign Application Priority Data

Mar. 14, 2014 (TW) .............................. 106203529 U

(51) Int. Cl.
*B62J 11/00* (2006.01)

(52) U.S. Cl.
CPC ........ *B62J 11/00* (2013.01); *B62J 2300/0006* (2013.01)

(58) Field of Classification Search
CPC .............. B62J 11/00; B62J 2099/0033; B60R 11/0241; B60R 2011/0071; F16M 11/041; F16M 13/00; F16M 13/02
See application file for complete search history.

(56) References Cited

U.S. PATENT DOCUMENTS

| | | | | |
|---|---|---|---|---|
| 5,187,744 A * | 2/1993 | Richter | ............... | B60R 11/0241 224/553 |
| 5,788,202 A * | 8/1998 | Richter | ............... | B60R 11/0241 224/570 |
| 8,490,937 B2 * | 7/2013 | Crain | ..................... | G01C 15/00 224/929 |
| 8,727,192 B2 * | 5/2014 | Lai | ..................... | B60R 11/0241 224/282 |
| 8,998,048 B1 * | 4/2015 | Wu | .......................... | B62J 11/00 224/420 |
| 9,476,439 B1 * | 10/2016 | Liao | ......................... | F16B 2/12 |
| 9,710,016 B1 * | 7/2017 | Porzio | ................... | G06F 1/1632 |
| 9,840,264 B1 * | 12/2017 | Johnson | ................ | B62B 3/1416 |
| 2003/0218113 A1 * | 11/2003 | Sullivan | ................. | F16M 13/00 248/346.07 |
| 2004/0026590 A1 * | 2/2004 | Lin | ....................... | A47B 23/002 248/346.04 |
| 2007/0045495 A1 * | 3/2007 | Asano | .................. | B60R 11/0241 248/309.1 |

* cited by examiner

*Primary Examiner* — Corey Skurdal
(74) *Attorney, Agent, or Firm* — Rosenberg, Klein & Lee

(57) ABSTRACT

A bicycle cellular phone holder structure includes a base seat having a first end and a second end. The first end is formed with a first threaded hole in which a first rod member is screwed. One end of the first rod member is assembled with a first holding member, while the other end of the first rod member is mated with a rotational member. The rotational member is formed with a second threaded hole in which a second rod member is screwed. The second rod member is assembled with a second holding member. When rotating the first rod member, the first holding member is moved toward the outer side of the first end or the second end and the second holding member is moved toward the outer side of the second end or the first end so that the first and second holding members are synchronously moved.

36 Claims, 6 Drawing Sheets

BICYCLE CELLULAR PHONE HOLDER STRUCTURE

BACKGROUND OF THE INVENTION

1. Field of the Invention

The present invention relates generally to a bicycle cellular phone holder structure, and more particularly to a bicycle cellular phone holder structure employing threaded rods to adjust the opening/closing amount between two holding members, whereby the two holding members are synchronously opened or closed.

2. Description of the Related Art

The current cellular phone (or tablet) already has such as map, satellite navigation or dashboard cam function. Therefore, when riding a bicycle (or a motorcycle), a rider can immediately realize the current position or continuously shoot and record. This is quite convenient. In order to securely mount the cellular phone on the bicycle, various cellular phone holder structures are now commercially available. The cellular phone holder structure can be secured to the handlebar of the bicycle to hold the cellular phone. Generally, the conventional cellular phone holder structure has a base seat and multiple holding members disposed on the base seat for holding the cellular phone. The opening/closing amount between two holding members is adjustable by means of gears, racks or threaded rods so as to hold or release the cellular phone.

Another conventional type of cellular phone holder employs energy-reserving springs to elastically hold the cellular phone. However, as well known by those who are skilled in this field, due to the factors of continuous shocking in riding and elastic fatigue, the holding effect of the elastic cellular phone holder will be affected to cause dropping of the cellular phone. Therefore, the cellular phone holder structure employing threaded rods to adjust the holding members has more securely holding effect for the cellular phone.

Please refer to FIG. 1. The existent cellular phone holder structure employing threaded rods to adjust the holding members mainly includes a base seat 100 and a first holding member 210 fixed at one end of the base seat 100. A threaded rod 300 is disposed at the other end of the base seat 100 for driving a second holding member 220 to move toward or away from the first holding member 210 (or the other end of the base seat 100). Accordingly, the cellular phone holder structure is used in such a manner that the second holding member 220 is opened or closed on one single side of the base seat 100. In this case, the opening/closing amount between the first and second holding members 210, 220 can be adjusted in accordance with the length of the cellular phone, whereby the cellular phone can be held between the first and second holding members 210, 220.

In practice, the central section of the base seat 100 of the conventional cellular phone holder structure is generally assembled with a fastening holder 600 for mounting the cellular phone holder structure on the bicycle. The fastening holder 600 serves to support the base seat 100 and the cellular phone. The assembling section of the base seat 100, which is assembled with the fastening holder 600, serves as a support point A or gravity center where the fastening holder 600 supports the base seat 100 and the cellular phone.

In use, the distance between the support point A and the first holding member 210 is fixed. The threaded rod 300 is operated on one single side to adjust the second holding member 220 to move toward or away from the first holding member 210. In such structural form, only one single side (the second holding member 220) is moved. Therefore, the distance between the support point A and the second holding member 220 is unequal to the distance between the support point A and the first holding member 210 (or the lengths on two sides of the support point A are not unified). As a result, the gravity center of the cellular phone will be deviated from the support point A.

In riding the bicycle, the continuous shocking of the bicycle will be transmitted through the fastening holder 600, the base seat 100 and/or the first and second holding members 210, 220 to the cellular phone. As a result, the cellular phone will be continuously shocked. As aforesaid, the gravity center of the cellular phone is deviated from the support point A. Therefore, the shocking amplitude of the cellular phone on two sides of the support point A is not equalized. Under such circumstance, the cellular phone is apt to loosen and drop down from the space between the first and second holding members 210, 220.

SUMMARY OF THE INVENTION

It is therefore a primary object of the present invention to provide a bicycle cellular phone holder structure including two symmetrical holding members. The two symmetrical holding members are driven to synchronously opened or closed. The bicycle cellular phone holder structure includes:

a base seat having a first end and a second end at two ends, the first end is formed with a first threaded hole extending toward the second end;

a first holding member arranged at the first end;

a second holding member arranged at the second end opposite to the first holding member;

a first rod member having an operation end, a driving end and a threaded section positioned between the operation end and the driving end, the threaded section being screwed in the first threaded hole, the operation end extending to the first end, the driving end extending to the second end, the first holding member being disposed on the operation end;

a rotational member disposed on the base seat (near the second end), two ends of the rotational member being respectively formed with a driven end and a second threaded hole, the driving end being mated with the driven end to rotate the rotational member; and a second rod member having a threaded end, the threaded end being screwed in the second threaded hole, the second holding member being assembled with the second rod member.

According to the above arrangement, when adjusting the opening/closing amount between the first and second holding members, the operation end of the first rod member is operated to rotate the operation end, the threaded section and the driving end of the first rod member. The threaded section is rotated within the first threaded hole, whereby the operation end drives the first holding member to move toward the outer side of the first end of the base seat (or toward the second end of the base seat). At the same time, the driving end rotates the driven end of the rotational member to rotate the second threaded hole of the rotational member. Accordingly, the second threaded hole is rotated around the threaded end of the second rod member, whereby the second rod member is driven to move toward the outer side of the second end of the base seat (or toward the first end of the base seat) along with the second holding member. Therefore, the first and second holding members are synchronously opened or closed. That is, the distance by which the first holding member moves relative to the base seat is equal to the distance by which the second holding member moves relative to the base seat. Therefore, when the first and second holding members hold a cellular phone (or a table), the lengths of the cellular phone positioned on two sides of the support point of the middle (or the center) of the base seat are equal to each other. In this case, the gravity of the middle (or the center) of the cellular phone will fall onto the support point of the base seat. This solves the problem of the conventional cellular phone holder that the gravity of the cellular phone is deviated from the support point. The gravity of the cellular phone falls onto the support point of the base seat. Therefore, when the cellular phone is shocked during the bicycle riding, the shocking amplitude of the cellular phone on two sides of the support point can be equalized. In this case, the cellular phone can be more securely held and located.

In the above bicycle cellular phone holder structure, the second end of the base seat is formed with a cavity in communication with the first threaded hole. The rotational member is received in the cavity.

In the above bicycle cellular phone holder structure, a bottom cover is disposed under a bottom face of the base seat between the first and second ends. The cavity is positioned between the bottom face of the base seat and the bottom cover. The bottom cover is formed with an assembling opening. Via the assembling opening, the bottom face of the base seat is pivotally connected on a fastening holder.

In the above bicycle cellular phone holder structure, the driven end is formed with a split. The split has two inner walls opposite to each other. The driving end is movably fitted in the split. The driving end has two symmetrical outer walls respectively attaching to the inner walls of the split.

In the above bicycle cellular phone holder structure, a protrusion section is disposed on the driving end. The opening of the first threaded hole serves to stop the protrusion section.

In the above bicycle cellular phone holder structure, the first holding member is formed with a through hole in alignment with the first threaded hole. The operation end passes through the through hole. A rotary button and a retainer ring are disposed on the operation end. The first holding member is positioned between the rotary button and the retainer ring, whereby the first holding member is disposed on the operation end with the operation end rotatable.

In the above bicycle cellular phone holder structure, the second holding member is formed with a fixing hole in alignment with the second threaded hole. Two ends of the second rod member are respectively formed with the threaded end and a fixed end. The fixed end is disposed in the fixing hole. By means of recessed/raised stripes, the fixed end being securely assembled in the fixing hole.

In the above bicycle cellular phone holder structure, each of the first and second ends is formed with at least one guide hole. A guide rod is disposed in the guide hole. The guide rod of the first end is connected with the first holding member. The guide rod of the second end is connected with the second holding member.

The present invention can be best understood through the following description and accompanying drawings, wherein:

DETAILED DESCRIPTION OF THE PREFERRED EMBODIMENTS

Figure 1:
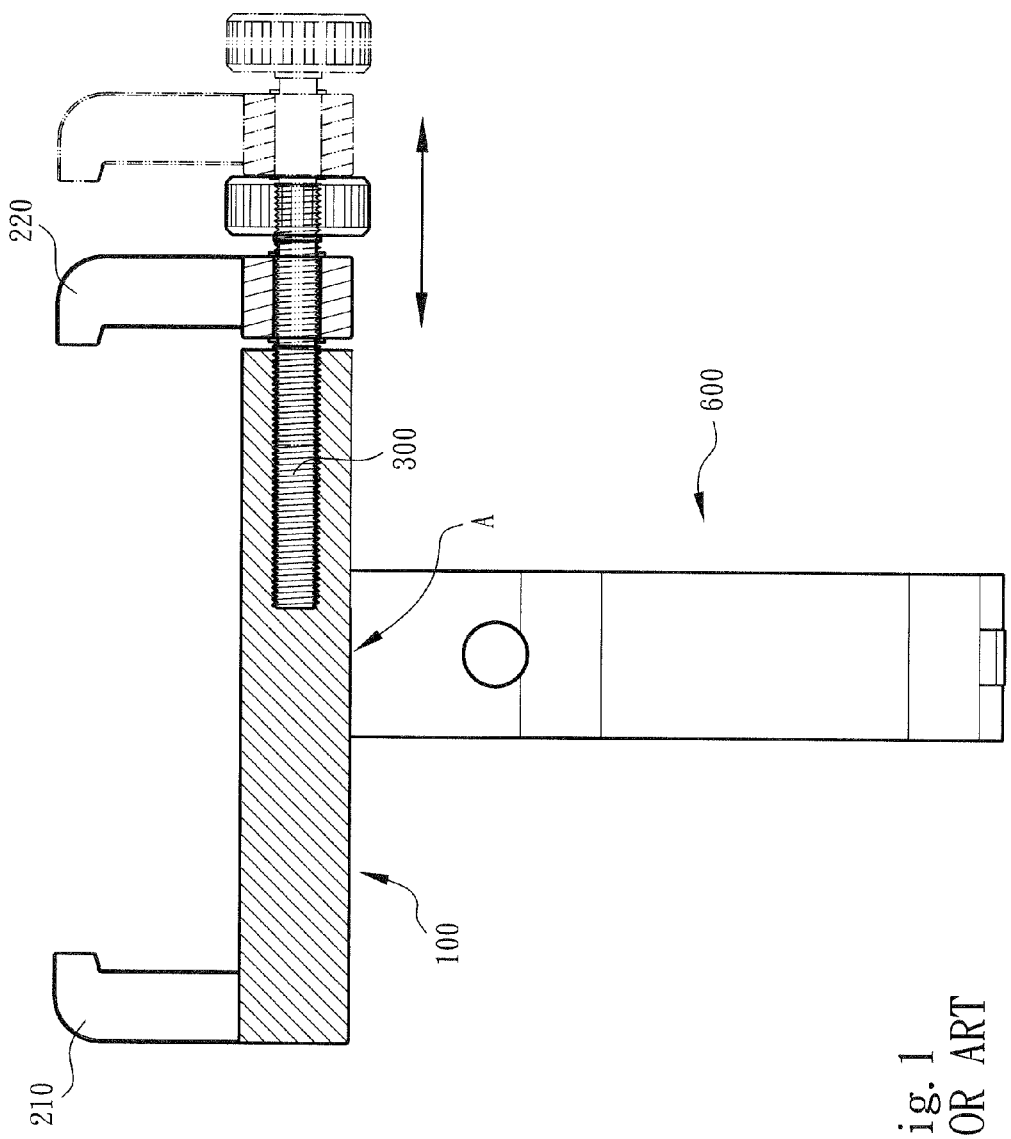
FIG. 1 is a sectional view of a conventional bicycle cellular phone holder structure.
Figure 2:
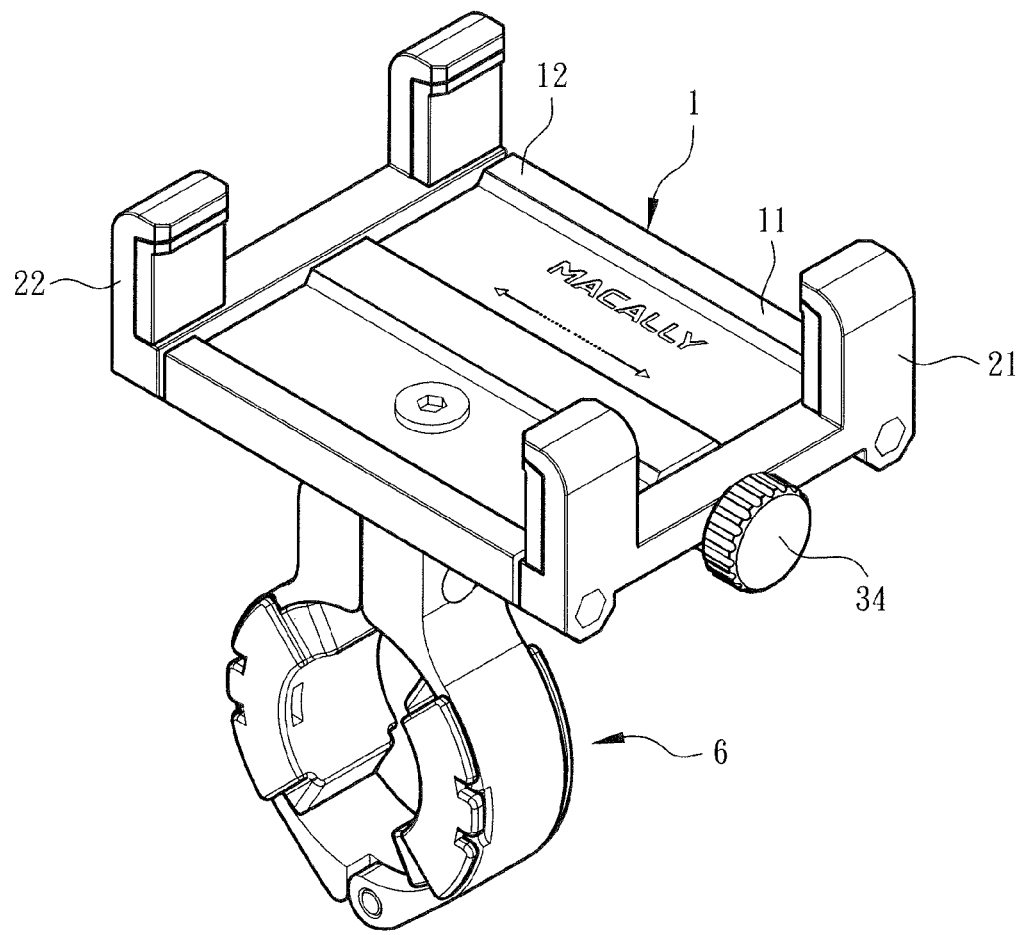
FIG. 2 is a perspective assembled view of a preferred embodiment of the present invention.
Figure 3:
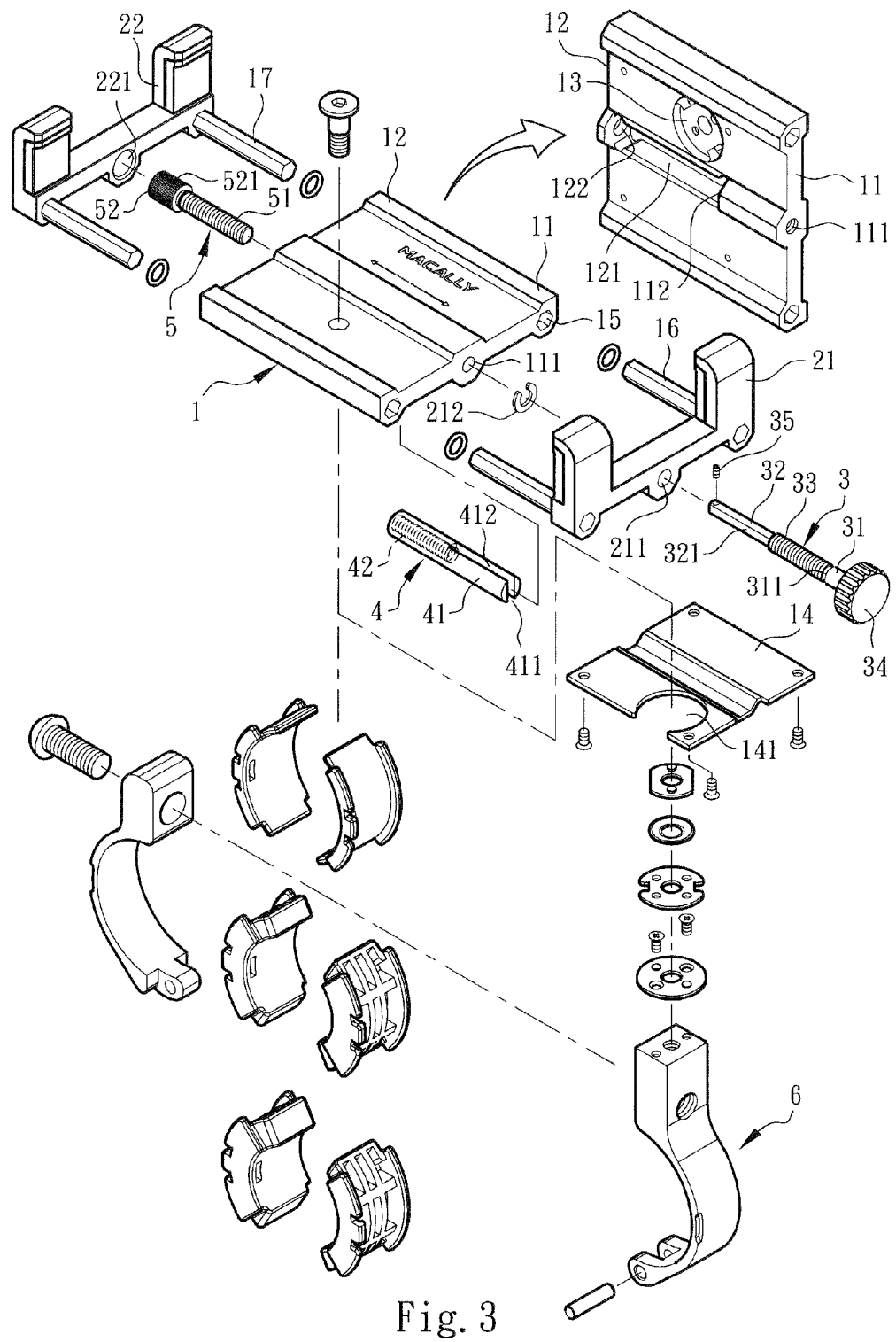
FIG. 3 is a perspective exploded view of the preferred embodiment of the present invention according to FIG. 2.
Figure 4:
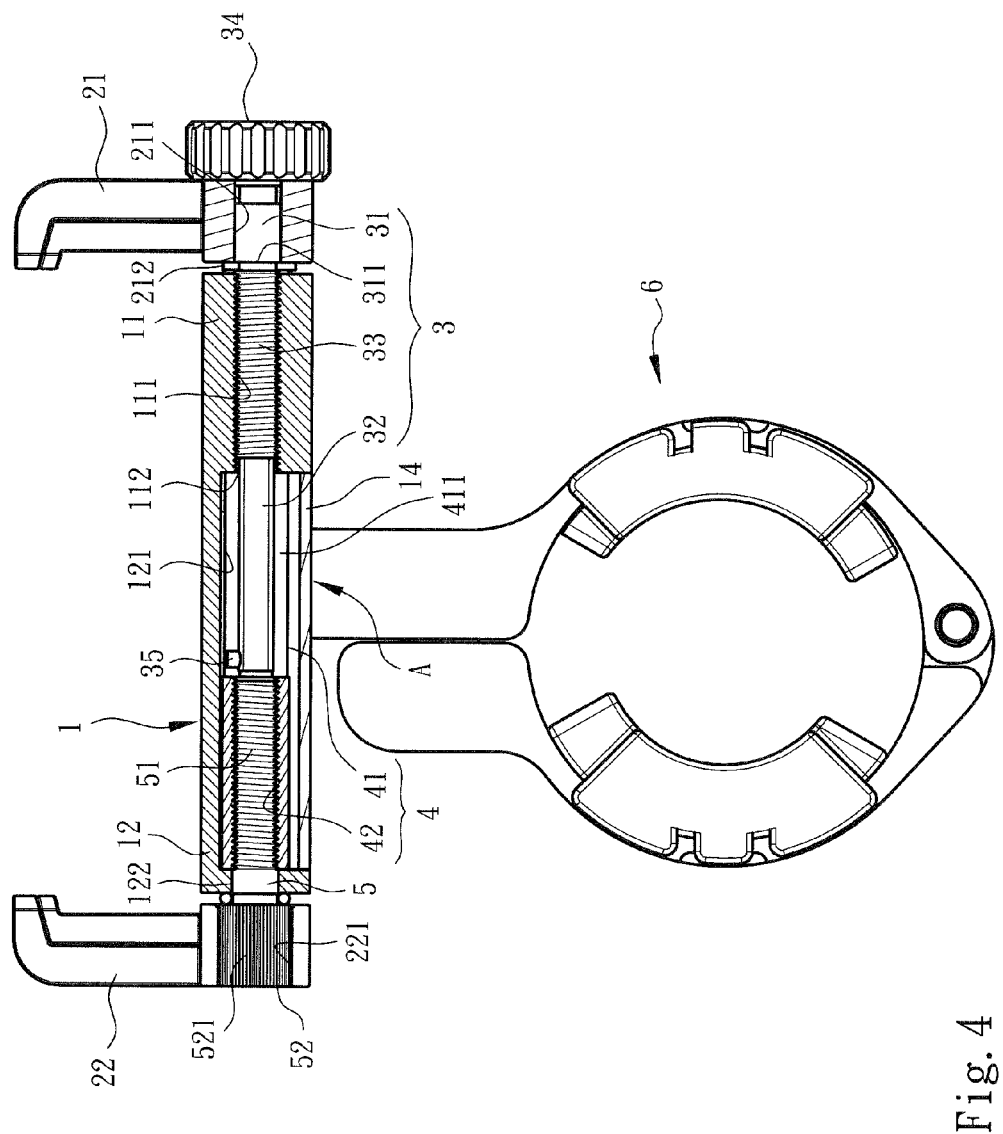
FIG. 4 is a sectional view of the preferred embodiment of the present invention according to FIG. 2.

Please refer to FIGS. 2 to 4. The bicycle cellular phone holder structure of the present invention includes base seat 1, a first holding member 21, a second holding member 22, a first rod member 3, a rotational member 4 and a second rod member, which are assembled with each other. The base seat 1 has a first end 11 and a second end 12 respectively at two ends of the base seat 1. A bottom cover 14 is disposed under a bottom face of the base seat 1 between the first and second ends 11, 12. The bottom cover 14 is formed with an assembling opening 141. The bottom face of the base seat 1 is formed with a recess 13. Via the assembling opening 141 and the recess 13, the base seat 1 is pivotally connected with a fastening holder 6. The fastening holder 6 can securely hold a bicycle (or a motorcycle).

Figure 6:
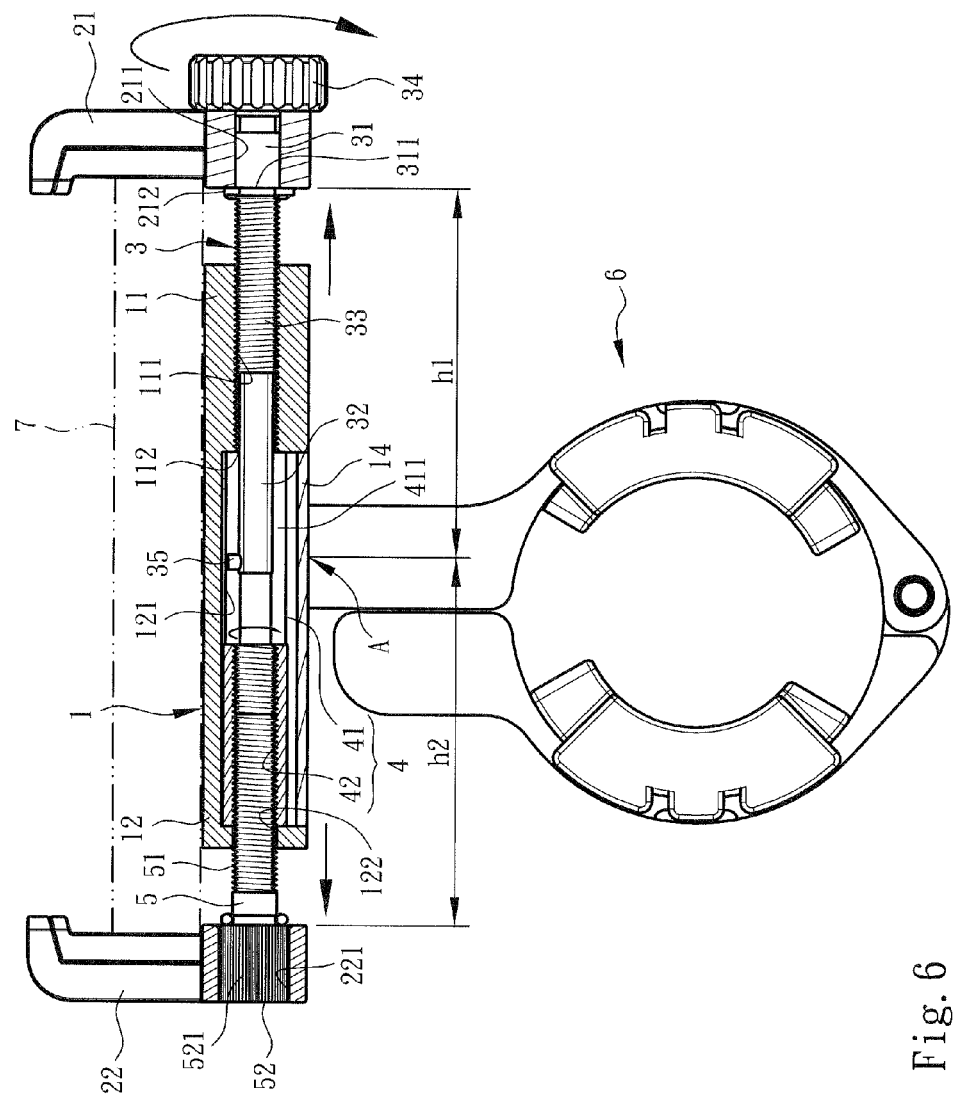
FIG. 6 is a sectional view of the preferred embodiment of the present invention according to FIG. 4, showing the use of the present invention.

The first holding member 21 is arranged on outer side of the first end 11 of the base seat 1. The second holding member 22 is arranged on outer side of the second end 12 of the base seat 1 opposite to the first holding member 21. Each of the first and second ends 11, 12 of the base seat 1 is formed with at least one guide hole 15. A guide rod 16, 17 is disposed in the guide hole 15. The guide rod 16 of the first end 11 of the base seat 1 is connected with the first holding member 21 for guiding the first holding member 21 to move toward the outer side of the first end 11 of the base seat 1 (as shown in FIG. 6) or toward the second holding member 22. The guide rod 17 of the second end 12 of the base seat 1 is connected with the second holding member 22 for guiding the second holding member 22 to move toward the outer side of the second end 12 of the base seat 1 or toward the first holding member 21.

As shown in the drawings, in a preferred embodiment, the first end 11 of the base seat 1 is formed with a first threaded hole 111 extending toward the second end 12 of the base seat 1. The second end 12 of the base seat 1 is formed with a cavity 121 in adjacency to the first threaded hole 111. The cavity 121 is positioned between the bottom face of the base seat 1 and the bottom cover 14 in communication with the first threaded hole 111. The other side of the cavity 121 communicates with the outer side of the second end 12 of the base seat 1 via a passage 122. The first rod member 3 has an operation end 31, a driving end 32 and a threaded section 33 positioned between the operation end 31 and the driving end 32. The first rod member 3 is placed into the first threaded hole 111 from the first end 11 of the base seat 1 with the threaded section 33 screwed in the first threaded hole 111. The operation end 31 extends to the outer side of the first end 11 of the base seat 1. A middle section of the first holding member 21 is formed with a through hole 211 in alignment with the first threaded hole 111. The operation end 31 passes through the through hole 211. A rotary button 34 and a retainer ring 212 are disposed on the operation end 31. The retainer ring 212 can be a C-shaped retainer ring or E-shaped retainer ring. The retainer ring 212 is secured to an annular groove 311 formed on the operation end 31. Accordingly, the first holding member 21 is restricted to be positioned between the rotary button 34 and the retainer ring 212. Therefore, the first holding member 21 is disposed on the operation end 31 with the operation end 31 rotatable. The rotary button 34 is positioned the outer side of the first holding member 21. The driving end 32 of the first rod member 3 passes through an opening 112 of the first threaded hole 111 and extends toward the cavity 121 or the second end 12 of the base seat 1.

The rotational member 4 is received in the cavity 121. Two ends of the rotational member 4 are respectively formed with a driven end 41 and a second threaded hole 42. The driven end 41 is aligned with the opening 112. The second threaded hole 42 is aligned with the passage 122. The driving end 32 of the first rod member 3 is mated with the driven end 41 to rotate the rotational member 4. To speak more specifically, the driven end 41 is formed with a split 411 (as shown in FIG. 3). The split 411 extends to the second threaded hole 42. The split 411 has two inner walls 412 opposite to each other. The driving end 32 is movably fitted in the split 411. The driving end 32 has two symmetrical outer walls 321 respectively attaching to the inner walls 412 of the split 411. Two ends of the second rod member 5 are respectively formed with a threaded end 51 and a fixed end 52. The threaded end 51 passes through the passage 122 to screw into the second threaded hole 42 of the rotational member 4. A middle section of the second holding member 22 is formed with a fixing hole 221. The fixed end 52 of the second rod member 5 is disposed in the fixing hole 221. Recessed/raised stripes 521 are formed on the fixed end 52. By means of the recessed/raised stripes 521, the fixed end 52 is fixed in the fixing hole 221.

As shown in FIGS. 3 and 4, in a preferred embodiment, a protrusion section 35 is disposed on the driving end 32. The opening 112 of the first threaded hole 111 (or the inner wall of the cavity 121) serves to stop the protrusion section 35 to prevent the first rod member 3 from dropping out of the first threaded hole 111. Alternatively, the protrusion section 35 cooperates with the split 411, whereby the driving end 32 can drive the rotational member 4 to rotate.

Figure 5:
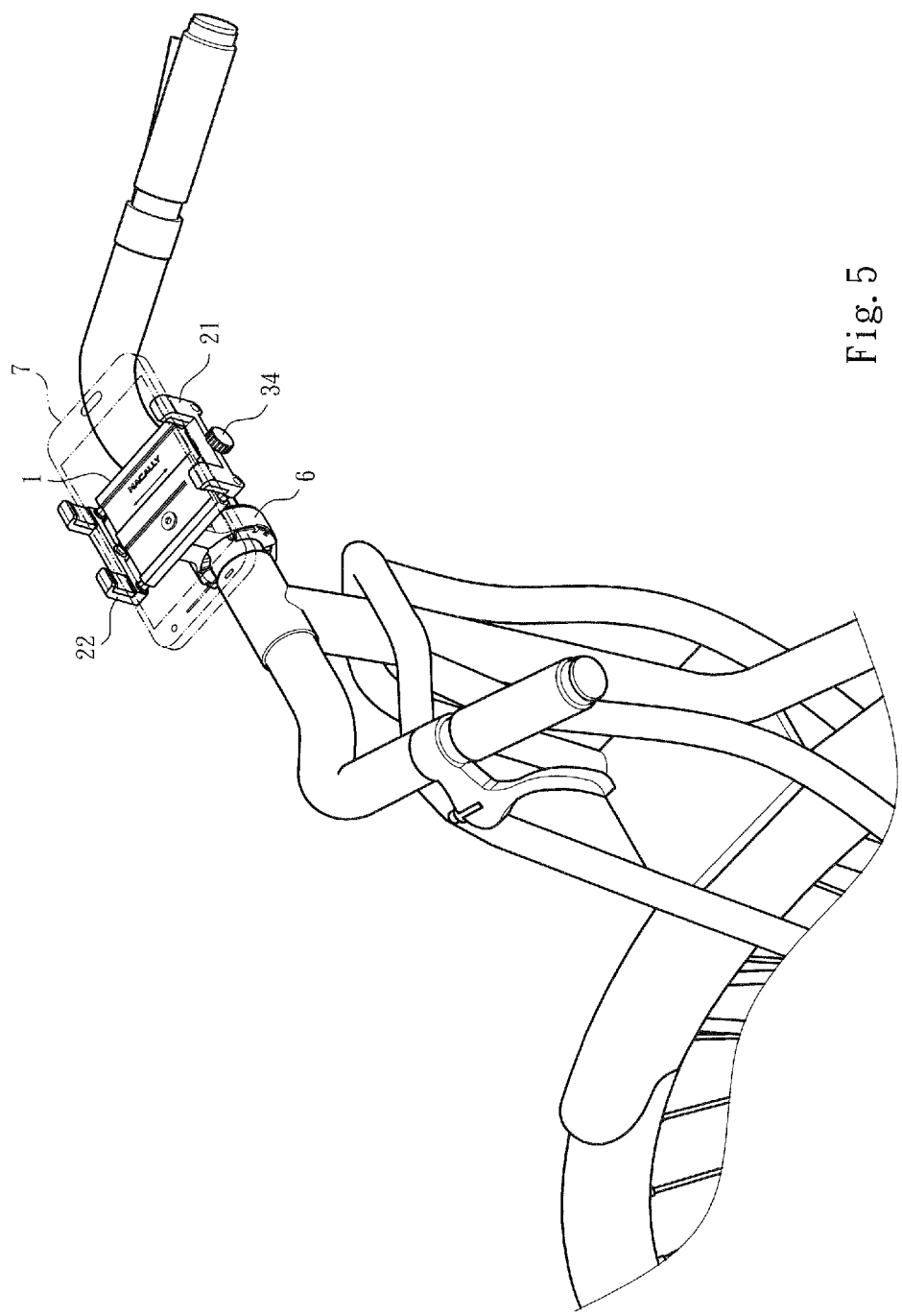
FIG. 5 is a perspective view of the preferred embodiment of the present invention according to FIG. 2, showing the use of the present invention.

Please now refer to FIGS. 4 to 6. In use, via the fastening holder 6, the base seat 1 can be mounted on a bicycle. The fastening holder 6 serves to support the base seat 1. The assembling section of the middle (or the center) of the base seat 1, which is assembled with the fastening holder 6, serves as a support point A where the fastening holder 6 supports the base seat 1. When adjusting the opening/closing amount between the first and second holding members, 21, 22, the rotary button 34 on the operation end 31 of the first rod member 3 is rotated to drive the operation end 31, the threaded section 33 and the driving end 32 of the first rod member 3 to rotate. The threaded section 33 is rotated within the first threaded hole 111, whereby the operation end 31 drives the first holding member 21 to move toward the outer side of the first end 11 of the base seat 1 (or toward the second end 12 of the base seat 1). At the same time, the driving end 32 (or the outer walls 321) cooperates with the inner walls 412 of the split 411 of the driven end 41 to synchronously rotate the rotational member 4, whereby the second threaded hole 42 of the rotational member 4 is driven and rotated. At this time, the driving end 32 can relatively displace within the split 411 toward the first end 11 of the base seat 1 (or toward the second holding member 22). Also, the second threaded hole 42 is rotated around the threaded end 51 of the second rod member 5, whereby the second rod member 5 is driven to move toward the outer side of the second end 12 of the base seat 1 (or toward the first end 11 of the base seat 1) along with the second holding member 22. Accordingly, the first and second holding members 21, 22 are synchronously opened or closed. That is, when the first holding member 21 moves relative to the base seat 1 by a distance h1, the second holding member 22 will simultaneously move relative to the base seat 1 by a distance h2 and the distance h1 is equal to the distance h2.

Therefore, when the first and second holding members 21, 22 hold a cellular phone 7 (or a table), the lengths of the cellular phone 7 positioned on two sides of the support point A of the base seat 1 are equal to each other. In this case, the gravity of the middle (or the center) of the cellular phone 7 will fall onto the support point A of the base seat 1. This solves the problem of the conventional cellular phone holder that the gravity of the cellular phone is deviated from the support point A. The gravity of the cellular phone 7 falls onto the support point A of the base seat 1. Therefore, when the cellular phone 7 is shocked during the bicycle riding, the shocking amplitude of the cellular phone 7 on two sides of the support point A can be equalized. In this case, the cellular phone 7 can be more securely held and located.

The above embodiments are only used to illustrate the present invention, not intended to limit the scope thereof. Many modifications of the above embodiments can be made without departing from the spirit of the present invention.

What is claimed is:

1. A bicycle cellular phone holder structure comprising:
   a base seat having a first end and a second end respectively at two ends of the base seat;
   a first holding member arranged at the first end;
   a second holding member arranged at the second end opposite to the first holding member;
   a first rod member having an operation end, a driving end and a threaded section positioned between the operation end and the driving end, the threaded section being screwed in a first threaded hole, the operation end extending to the first end, the driving end extending to the second end, the first holding member being disposed on the operation end;
   a rotational member disposed on the base seat, two ends of the rotational member being respectively formed with a driven end and a second threaded hole, the driving end being mated with the driven end to rotate the rotational member; and
   a second rod member having a threaded end, the threaded end being screwed in the second threaded hole, the second holding member being assembled with the second rod member.

2. The bicycle cellular phone holder structure as claimed in claim 1, wherein the second end of the base seat is formed with a cavity in communication with the first threaded hole, the rotational member being received in the cavity.

3. The bicycle cellular phone holder structure as claimed in claim 2, wherein a bottom cover is disposed under a bottom face of the base seat between the first and second ends, the cavity being positioned between the bottom face of the base seat and the bottom cover, the bottom cover being formed with an assembling opening, via the assembling opening, the bottom face of the base seat being pivotally connected on a fastening holder.

4. The bicycle cellular phone holder structure as claimed in claim 1, wherein the driven end is formed with a split, the split having two inner walls opposite to each other, the driving end being movably fitted in the split, the driving end having two symmetrical outer walls respectively attaching to the inner walls of the split.

5. The bicycle cellular phone holder structure as claimed in claim 2, wherein the driven end is formed with a split, the split having two inner walls opposite to each other, the driving end being movably fitted in the split, the driving end having two symmetrical outer walls respectively attaching to the inner walls of the split.

6. The bicycle cellular phone holder structure as claimed in claim 3, wherein the driven end is formed with a split, the split having two inner walls opposite to each other, the driving end being movably fitted in the split, the driving end having two symmetrical outer walls respectively attaching to the inner walls of the split.

7. The bicycle cellular phone holder structure as claimed in claim 4, wherein a protrusion section is disposed on the driving end, the opening of the first threaded hole serving to stop the protrusion section.

8. The bicycle cellular phone holder structure as claimed in claim 5, wherein a protrusion section is disposed on the driving end, the opening of the first threaded hole serving to stop the protrusion section.

9. The bicycle cellular phone holder structure as claimed in claim 6, wherein a protrusion section is disposed on the driving end, the opening of the first threaded hole serving to stop the protrusion section.

10. The bicycle cellular phone holder structure as claimed in claim 1 wherein the first holding member is formed with a through hole in alignment with the first threaded hole, the operation end passing through the through hole, a rotary button and a retainer ring being disposed on the operation end, the first holding member being positioned between the rotary button and the retainer ring, whereby the first holding member is disposed on the operation end with the operation end rotatable.

11. The bicycle cellular phone holder structure as claimed in claim 2, wherein the first holding member is formed with a through hole in alignment with the first threaded hole, the operation end passing through the through hole, a rotary button and a retainer ring being disposed on the operation end, the first holding member being positioned between the rotary button and the retainer ring, whereby the first holding member is disposed on the operation end with the operation end rotatable.

12. The bicycle cellular phone holder structure as claimed in claim 3, wherein the first holding member is formed with a through hole in alignment with the first threaded hole, the operation end passing through the through hole, a rotary button and a retainer ring being disposed on the operation end, the first holding member being positioned between the rotary button and the retainer ring, whereby the first holding member is disposed on the operation end with the operation end rotatable.

13. The bicycle cellular phone holder structure as claimed in claim 4, wherein the first holding member is formed with a through hole in alignment with the first threaded hole, the operation end passing through the through hole, a rotary button and a retainer ring being disposed on the operation end, the first holding member being positioned between the rotary button and the retainer ring, whereby the first holding member is disposed on the operation end with the operation end rotatable.

14. The bicycle cellular phone holder structure as claimed in claim 5, wherein the first holding member is formed with a through hole in alignment with the first threaded hole, the operation end passing through the through hole, a rotary button and a retainer ring being disposed on the operation end, the first holding member being positioned between the rotary button and the retainer ring, whereby the first holding member is disposed on the operation end with the operation end rotatable.

15. The bicycle cellular phone holder structure as claimed in claim 6, wherein the first holding member is formed with a through hole in alignment with the first threaded hole, the operation end passing through the through hole, a rotary button and a retainer ring being disposed on the operation end, the first holding member being positioned between the rotary button and the retainer ring, whereby the first holding member is disposed on the operation end with the operation end rotatable.

16. The bicycle cellular phone holder structure as claimed in claim 1, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

17. The bicycle cellular phone holder structure as claimed in claim 2, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

18. The bicycle cellular phone holder structure as claimed in claim 3, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

19. The bicycle cellular phone holder structure as claimed in claim 4, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

20. The bicycle cellular phone holder structure as claimed in claim 5, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

21. The bicycle cellular phone holder structure as claimed in claim 6, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

22. The bicycle cellular phone holder structure as claimed in claim 10, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

23. The bicycle cellular phone holder structure as claimed in claim 11, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

24. The bicycle cellular phone holder structure as claimed in claim 12, wherein the second holding member is formed with a fixing hole in alignment with the second threaded hole, two ends of the second rod member being respectively formed with the threaded end and a fixed end, the fixed end being disposed in the fixing hole, by means of recessed/raised stripes, the fixed end being securely assembled in the fixing hole.

25. The bicycle cellular phone holder structure as claimed in claim 1, wherein each of the first and second ends is formed with at least one guide hole, a guide rod being disposed in the guide hole, the guide rod of the first end being connected with the first holding member, the guide rod of the second end being connected with the second holding member.

26. The bicycle cellular phone holder structure as claimed in claim 2, wherein each of the first and second ends is formed with at least one guide hole, a guide rod being disposed in the guide hole, the guide rod of the first end being connected with the first holding member, the guide rod of the second end being connected with the second holding member.

27. The bicycle cellular phone holder structure as claimed in claim 3, wherein each of the first and second ends is formed with at least one guide hole, a guide rod being disposed in the guide hole, the guide rod of the first end being connected with the first holding member, the guide rod of the second end being connected with the second holding member.

28. The bicycle cellular phone holder structure as claimed in claim 4, wherein each of the first and second ends is formed with at least one guide hole, a guide rod being disposed in the guide hole, the guide rod of the first end being connected with the first holding member, the guide rod of the second end being connected with the second holding member.

29. The bicycle cellular phone holder structure as claimed in claim 5, wherein each of the first and second ends is formed with at least one guide hole, a guide rod being disposed in the guide hole, the guide rod of the first end being connected with the first holding member, the guide rod of the second end being connected with the second holding member.

30. The bicycle cellular phone holder structure as claimed in claim 6, wherein each of the first and second ends is formed with at least one guide hole, a guide rod being disposed in the guide hole, the guide rod of the first end being connected with the first holding member, the guide rod of the second end being connected with the second holding member.

31. The bicycle cellular phone holder structure as claimed in claim 10, wherein each of the first and second ends is formed with at least one guide hole, a guide rod being disposed in the guide hole, the guide rod of the first end being connected with the first holding member, the guide rod of the second end being connected with the second holding member.

32. The bicycle cellular phone holder structure as claimed in claim 11, wherein each of the first and second ends is formed with at least one guide hole, a guide rod being disposed in the guide hole, the guide rod of the first end being connected with the first holding member, the guide rod of the second end being connected with the second holding member.

33. The bicycle cellular phone holder structure as claimed in claim 12, wherein each of the first and second ends is formed with at least one guide hole, a guide rod being disposed in the guide hole, the guide rod of the first end being connected with the first holding member, the guide rod of the second end being connected with the second holding member.

34. The bicycle cellular phone holder structure as claimed in claim 16, wherein each of the first and second ends is formed with at least one guide hole, a guide rod being disposed in the guide hole, the guide rod of the first end being connected with the first holding member, the guide rod of the second end being connected with the second holding member.

35. The bicycle cellular phone holder structure as claimed in claim 17, wherein each of the first and second ends is formed with at least one guide hole, a guide rod being disposed in the guide hole, the guide rod of the first end being connected with the first holding member, the guide rod of the second end being connected with the second holding member.

36. The bicycle cellular phone holder structure as claimed in claim 18, wherein each of the first and second ends is formed with at least one guide hole, a guide rod being disposed in the guide hole, the guide rod of the first end being connected with the first holding member, the guide rod of the second end being connected with the second holding member.

* * * * *